United States Patent
Schmidhuber et al.

[19]

[11] Patent Number: 6,030,024
[45] Date of Patent: Feb. 29, 2000

[54] MOTOR VEHICLE DOOR

[75] Inventors: Horst Schmidhuber, Schondorf; Jochen Haussmann, Starnberg/Wangen; Martin Danzl, Neubeuern, all of Germany

[73] Assignee: Webasto Tursysteme GmbH, Stockdorf, Germany

[21] Appl. No.: 09/015,661

[22] Filed: Jan. 29, 1998

[30] Foreign Application Priority Data

Feb. 8, 1997 [DE] Germany .................... 197 04 811

[51] Int. Cl.[7] ............................................. B60J 5/06
[52] U.S. Cl. ................... 296/146.12; 49/216; 49/218; 49/219
[58] Field of Search ....................... 296/146.1, 146.11, 296/146.12, 155, 190.1, 202; 49/209, 210, 211, 216, 218, 219, 220

[56] References Cited

U.S. PATENT DOCUMENTS

| | | | |
|---|---|---|---|
| 2,542,605 | 2/1951 | Werner | 296/146.12 |
| 4,025,104 | 5/1977 | Grossbach et al. | 296/155 |
| 4,135,760 | 1/1979 | Grossbach | 296/155 |
| 4,433,505 | 2/1984 | Viner | 49/110 |
| 5,398,988 | 3/1995 | DeRees et al. | 296/155 |

FOREIGN PATENT DOCUMENTS

| | | | |
|---|---|---|---|
| 4133179 | 4/1993 | Germany | 49/211 |
| 163915 | 12/1981 | Japan | 296/155 |

*Primary Examiner*—D. Glenn Dayoan
*Assistant Examiner*—Chad D Wells
*Attorney, Agent, or Firm*—Sixbey, Friedman, Leedom & Ferguson; David S. Safran

[57] ABSTRACT

A door arrangement for opening and closing a motor vehicle door in a door opening (2) in an outside vehicle wall (1), having at least one door panel (3) which, in the closed position, assumes a position that is essentially flush position with the outside wall (1) and which can be swung into an open position which at least partially exposes the door opening, and in which the door panel (3), outside of the vehicle, assumes a roughly parallel position to outside wall (1). The door panel (3) is connected to the vehicle to swing via at least one pivoting lever (5). To enhance the sealing action in the closed position, it is provided that a forward edge (31) of the door panel (3), by way of a linkage mechanism (7, 8, 9) executes a movement by which this edge (31) fits from inside behind the associated edge (door frame 4B) of outside wall (1) or a seal (10) located thereon, in the closed position.

18 Claims, 2 Drawing Sheets

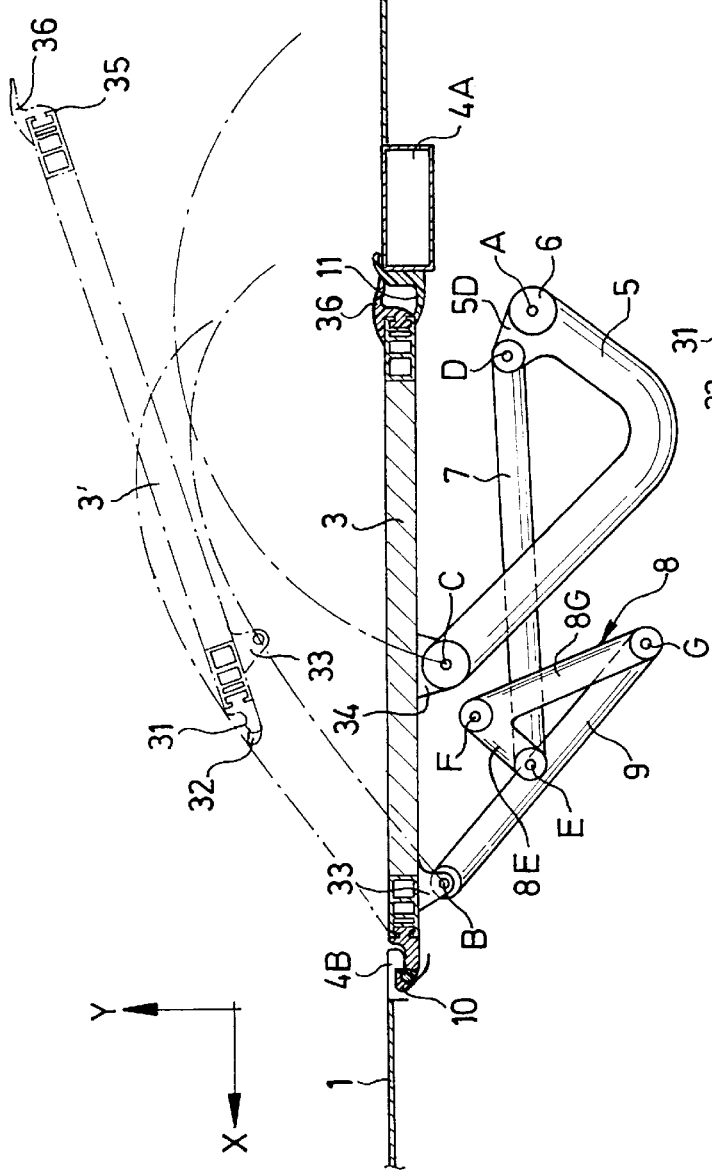
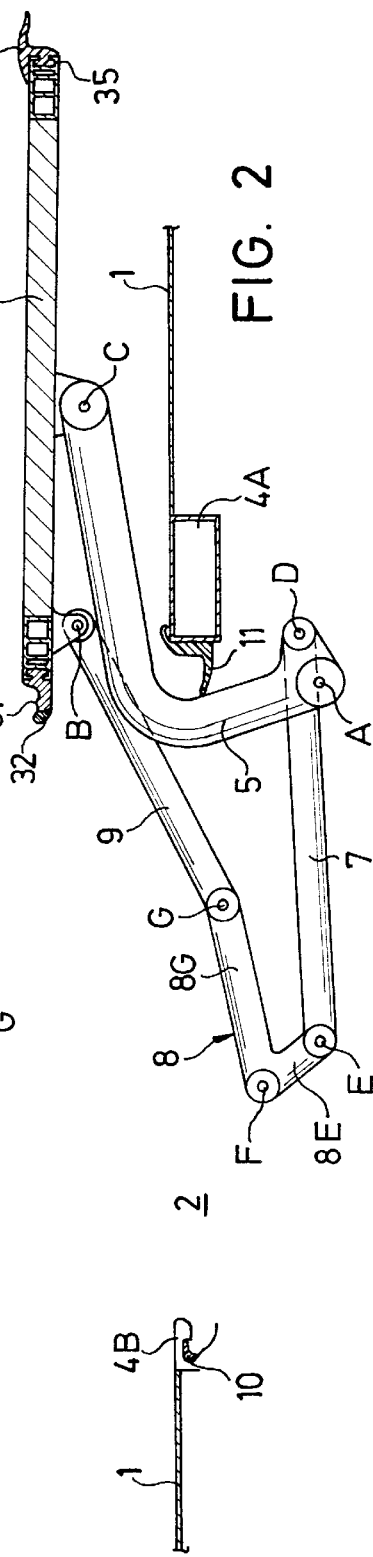

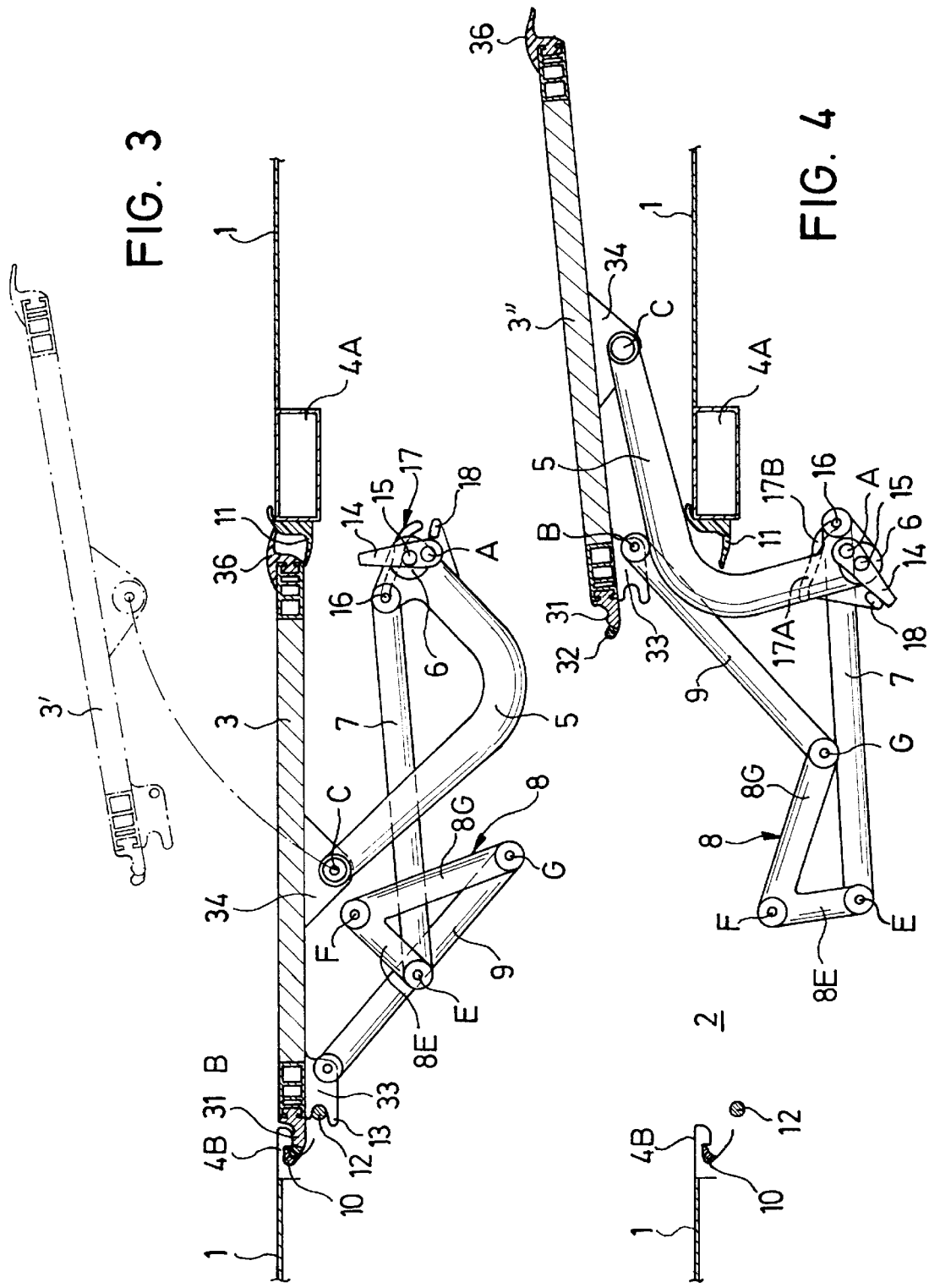

MOTOR VEHICLE DOOR

BACKGROUND OF THE INVENTION

1. Field of the Invention

The invention relates to a motor vehicle door for closing a door opening in the outside wall of a motor vehicle with at least one door panel which, in the closed position, assumes an essentially flush position with the outside wall, and by means of a pivoting linkage having at least one lever, can be swung into an open position in which the door opening is at least partially exposed, the door panel assuming a roughly parallel position relative to the outside wall of the vehicle.

2. Description of Related Art

Vehicle doors of the type to which the invention is directed are also called outward swinging doors in the trade, and are moved in an arc-shaped motion, by means of two pivoting levers, out of the door opening into an open position which is outside the outside vehicle wall and which is located roughly parallel to it. Because the seals located between the door leaf and door frame, in the initial phase of opening motion and the end phase of closing motion, are exposed to grinding and squeezing almost perpendicular to the outside wall of the vehicle, out of and into the door opening, they are subjected to increased wear. Furthermore, additional locking means, such as key collars located on the vehicle side, are required to keep the door leaf securely in the closed position in the door opening.

SUMMARY OF THE INVENTION

The primary object of the present invention is to devise an outward swinging door with an improved sealing and closing action.

This object is achieved by having the edge of the door panel which is forward during the closing motion, by means of a linkage mechanism, execute a movement by which this forward edge fits from the inside behind the associated edge (door frame) of the outside wall in the closed position or a seal located thereon, or a lock part (tie bar) located on the chassis in this area.

Because the edge of door panel which is forward in the closing motion fits behind the associated edge of the outside wall or a seal located on the wall, or alternatively, some lock part located on the chassis in this area, the edge is securely held in its position at high vehicle speeds despite corresponding suction forces which are caused by the incident wind and which is especially high on this front. Additional locking means as are conventional in the prior art can thus be completely omitted.

Preferably, the pivoting lever is driven in a conventional manner via a rotary shaft and the gear for producing the motion which causes the front edge to fit behind is driven at least indirectly, likewise, from the same rotary shaft. Thus, to actuate a vehicle door, a single drive which causes rotary motion of the rotary shaft, or a part connected to it, is sufficient.

The mechanism for generating the fitting-behind motion is preferably composed of three parts, specifically an auxiliary pivoting lever coupled near the front edge of the door panel, a connecting rod which is connected to the lever and which can pivot around an axis of rotation on the vehicle, and a coupler for joining the connecting rod to the rotary shaft and to a joint on the pivoting lever.

It is furthermore advantageous if the pivoting lever is connected, in the conventional manner, roughly to the middle of the door panel and has a right-angle bend of roughly 90 degrees. This arrangement and right angle bend enable the door opening to be almost completely exposed in the open position.

Especially safe locking in the closed position is achieved by the mechanism assuming a position near dead center in the closed position of the door leaf. This locking is easily achieved by a corresponding arrangement of the auxiliary swivelling lever and the fulcrum of the connecting rod.

The connecting rod is preferably made as a triangular lever; the coupler is connected to its shorter side and the auxiliary swivelling lever to its longer side. This design allows especially favorable kinematic conditions and good matching of required drive force and attainable closing force.

According to one advantageous embodiment of the invention, the pivoting lever has a shoulder which is eccentric relative to the rotary shaft, and on which the joint for connection of the coupling is located.

According to one alternative embodiment, it is provided that the coupler of the mechanism is guided with a guide pin in a crank that is located near the rotary shaft on the vehicle. This crank is composed, preferably, of a first slanted section, which the guide pin traverses during the locking and unlocking phase of the front edge of the door panel, and an arc-shaped segment which is located concentrically to the rotary shaft and which the guide pin transverses during the swinging motion of the door panel. In this alternative embodiment, the pivoting lever is driven, at least during the opening motion, via a cam connected to the rotary shaft.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 1 is a horizontal cross-sectional view of a motor vehicle door in the closed position of the door panel;

FIG. 2 is a representation as shown in FIG. 1, but with the door panel completely opened;

FIG. 3 is a view corresponding to that of FIG. 1, but of a second embodiment; and FIG. 4 is a view corresponding to that of FIG. 2, but of the FIG. 3 embodiment.

DETAILED DESCRIPTION OF THE PREFERRED EMBODIMENTS

In outside vehicle wall 1, for example, a side wall of a bus, there is door opening 2 which can be selectively closed or at least partially exposed by means of a door panel 3.

In FIG. 1, the direction of forward vehicle travel is labeled X, as is conventional in motor vehicle construction, and the axis transverse to the direction of travel is formed by the Y-axis. Door opening 2 is bounded by a door frame which is formed on the rear edge by a sleeper-like door frame part 4A and on the front edge, in direction X, by a door frame part 4B. Door leaf 3 can be actuated by a linkage mechanism composed of the following linkage components. Force is introduced into door panel 3 for its actuation by pivoting lever 5 which, in a conventional manner, is drive-linked to rotary shaft 6. Rotary shaft 6, for its part, is caused to rotate by a known pneumatic or electric drive (not shown), optionally with the interposition of a belt linkage. Motion of pivoting lever 5 can alternatively also take place by a pneumatic cylinder or hydraulic cylinder located between the lever and the vehicle chassis. The common axis of rotation of pivoting lever 5 and rotary shaft 6 is labeled A in FIGS. 1 and 2. Pivoting lever 5 is made as a crank lever with a bend of slightly less than 90°, the shorter side proceeding from the bend being joined to rotary shaft 6 and the longer side proceeding from the bend being joined in joint C to bracket 34 located roughly in the center of door panel 3 on its inside. Joint C can, as shown in the embodiment, also be slightly offset forward of the center in the direction of forward travel.

Near rotary shaft 6 or rotary axis A, the pivoting lever 5 has an eccentric shoulder 5D to which a coupling link 7 is attached to pivot at a joint D. Coupling link 7, at its other end, is coupled to pivot at a joint E on a connecting rod 8 which, for its part, is supported to pivot around a fixed axis of rotation F. Connecting rod 8 is an acute-angled lever, having a shorter side 8E extending from axis of rotation F to joint E connecting them together, and a longer side 8G extending from the axis of rotation F to the pivot joint G, to which an end of an auxiliary pivoting lever 9 is attached.

The opposite end of the auxiliary pivoting lever 9, at joint B, is coupled to pivot on a bracket 33 located near front edge 31 of door panel 3. The front edge of the door panel 3 has a seal 32 which, in the Y direction toward the outside of the vehicle, has a recess with which seal 32, in the closed position shown in FIG. 1, fits behind door frame part 4B. On rear edge 35 of door panel 3 is a seal 36 which has an outside lip which adjoins the outside vehicle wall 1 in the closed position from outside against door frame part 4A. The inside of door panel 3 in the closed position adjoins a projecting lip of seal 11 which is located on door frame part 4A. In the closed position of the door, in the area of rear edge 35, doubled sealing of the door gap is achieved by the projecting sealing lips on seals 36 and 11.

In the area of front door frame part 4B seal 10 is adjoined by the projecting lip of seal 32 in the closed position. Thus, the door panel 3, in the closed position shown in FIG. 1, in the area of the front edge of the door, has a seal which fits behind it, and in the area of its rear edge, a double seal is formed by means of projecting sealing lips on the door edge and on the door frame.

FIG. 1 also shows a phantom outline 3' of the door panel in a partially opened position. Furthermore, the paths of motion of joints B and C and of front edge 31 of the door panel 3 are shown in dot-dash lines. These path curves show that joint C, as is usual in a conventional outward swinging door, describes a simple circular path, while front hinge point B, and accordingly, also front edge 31 of the door panel, have a curved path composed of three sections. Joint B and front edge 31 describe a small, inwardly directed arc near the closed position, after which the curved path runs essentially obliquely outwardly and then passes into an outwardly bowed arc-shaped section shortly before reaching the full open position.

These paths of motion are generated by the rotary shaft 6 first being caused to rotate clockwise by means of a drive (not shown) in an opening motion proceeding from the position shown FIG. 1. In doing so, on the one hand, joint C moves on the circular path shown, and on the other, the connecting rod 8 is caused to rotate counterclockwise by the connection of coupler 7 to hinge point D. As a result, the auxiliary pivoting lever 9 is first drawn slightly inward by the longer side 8G of connecting rod 8, by which the small inward arc-shaped path of motion is produced, and then, it is guided outwardly along the obliquely running path segment of joint B. As noted above, an intermediate stage 3' of the door panel opening motion is shown in FIG. 1.

When the door panel reaches the completely opened position 3'' shown in FIG. 2, it is almost parallel to the outside wall 1 of the vehicle. In doing so, the near right angle bend of the pivoting lever 5 extends around the door frame part 4A at the rear edge of the door opening 2, by which joint C reaches its rearmost position. In addition, hinge point B near the front edge of the door panel has reached its rearmost position in which the auxiliary pivoting lever 9 and longer side 8G of connecting rod 8 assume an almost fully extended position which also ensures stable support in the open position of the door panel.

This stable support also arises in the closed position of door panel 3 according FIG. 1. This is achieved by the axis G of the auxiliary pivoting lever 9 being located with respect to the axis of rotation F of the connecting rod 8 such that it is located behind (inward of) axis F. Door panel 3 is thus pressed in the area of its front edge 31, which is also called the main closing edge, from the inside against door frame part 4B and seal 10 located there. Suction caused by the incident wind on the outside of the vehicle does not lead, as in conventional outward swinging doors, to movement of the door panel to the outside, but causes the door panel to be drawn more strongly against door frame part 4B. Especially good sealing and noise attenuation, especially at high speeds, is thereby guaranteed.

In a second embodiment shown in FIGS. 3 & 4, all parts which are the same as in the first embodiment are labeled with the same reference numbers. The two differences shown in the second embodiment relate, on the one hand, to the force introduced into the coupler 7 in the area of rotary shaft 6, and on the other hand, to locking in the area of front edge 31 of door panel 3.

In this regard, in the area of front edge 31 of the door panel, there is a tie bolt 12 which is located on the chassis and which interacts with the bracket 33 provided on the inside of door panel 3 in the area of the front edge, and notched bar tongue 13 on the bracket 33. This arrangement in which bar tongue 13 engages with the tie bolt 12 can also be provided in the first embodiment according to FIGS. 1 & 2. This engagement is especially feasible when door seal 32, in the area of front edge 31, is made relatively soft.

In the area of rotary shaft 6, the second embodiment has the following differences. Near rotary shaft 6, there is a crank 17 which is located on the chassis and which has a sloped path segment 17A which runs roughly obliquely to inwardly to the rear, and an arc-shaped section 17B which is adjacent thereto to the rear and which is located concentrically with respect to the axis of rotation A. Guide pin 16, which additionally joins pivoting lever 5 to coupler 7, fits into this crank 17. A cam 14, which is finger-shaped and which is joined via pin 15 to pivoting lever 5, is joined to rotary shaft 6. Pivoting lever S also has a stop 18 for cam 14 which points inwardly to the rear in the closed position.

The motion sequence in the second embodiment begins, proceeding from the closed position of FIG. 3, with the cam 14 being caused to rotate clockwise by rotary shaft 6. By the connection via pin 15, when cam 14 turns, pivoting lever 5 is drawn to the rear along oblique path segment 17A of the crank. As soon as cam 14, during its rotary motion, reaches stop 18 on pivoting lever 5, the guide pin 16, at the same time, enters arc-shaped segment 17B of crank 17 from oblique segment 17A. Starting here, the swinging motions of pivoting lever 5 begins, joint C, in turn, describing a circular arc path. The motion sequence of other gear elements 7, 8, 9 and front edge 31 of door panel 3 is thus similar to that of the first embodiment.

In the completely open position, the guide pin 16 has reached the rear end of the arc-shaped segment 17B of crank 17. During the reverse closing motion of door panel 3, the stop 18 is not drive-linked to cam 14. By coupling of the cam 14 to the pivoting lever 5 via pin 15, and the concentric arrangement of arc-shaped segment 17B, the pivoting lever 5 is forced to follow the counterclockwise closing motion of cam 14. In addition, as the closing motion continues, guide pin 16 is guided in oblique segment 17A of the crank 17 by the coupling of cam 14 to the pivoting lever 5 via pin 15.

By means of the invention, completely new kinematics for an outwardly swinging door is made available in which it is especially reliably held in the closed position on the main closing edge as a result of the forward edge's fitting behind it. The drive is comparatively simple and durable in construction. It is completely unnecessary to provide and continually readjust additional key collars, as in conventional outwardly swinging doors.

While only two embodiments have been shown and described, numerous changes and modifications thereto will be apparent to those skilled in the art. Therefore, this invention is intended to include all such changes and modifications as are encompassed by the scope of the appended claims.

We claim:

1. A motor vehicle door arrangement for closing a door opening in an outside wall of a motor vehicle, comprising at least one door panel which in a closed position assumes an essentially flush position with the outside wall and a pivoting drive having a pivoting lever for swinging the door panel into an open position in which the door opening is at least partially exposed, the door panel assuming a position roughly parallel to said outside wall; wherein said pivoting drive comprises a linkage mechanism having means for causing a forward edge of the door panel, which is forward in a closing direction, to execute a movement by which said forward edge fits from the inside behind an associated part at an edge of the outside wall in the closed position, wherein said pivoting lever is connected between an axis of rotation which is fixed relative to the vehicle and an axis of rotation that is fixed at the door panel, and wherein said linkage mechanism is connected to the pivoting lever and to an axis of rotation on the door panel which is displaced from the axis of rotation on the door panel to which the pivoting lever is connected.

2. Motor vehicle door arrangement according to claim 1, wherein said associated part is a door frame of the outside wall.

3. Motor vehicle door arrangement according to claim 1, wherein said associated part is a seal located on an edge of the outside wall.

4. Motor vehicle door arrangement according to claim 1, wherein said associated part is a lock part located on a chassis of the vehicle in an area of an edge of the outside wall.

5. Motor vehicle door as claimed in claim 1, wherein said pivoting lever is driven via a rotary shaft which also at least indirectly drives said linkage mechanism.

6. Motor vehicle door arrangement for closing a door opening in an outside wall of a motor vehicle, comprising at least one door panel which in a closed position assumes an essentially flush position with the outside wall and a pivoting drive having a pivoting lever for swinging the door panel into an open position in which the door opening is at least partially exposed, the door panel assuming a position roughly parallel to said outside wall; wherein said pivoting drive comprises a linkage mechanism having means for causing a forward edge of the door panel, which is forward in a closing direction, to execute a movement by which said forward edge fits from the inside behind an associated part at an edge of the outside wall in the closed position; wherein said pivoting lever is driven via a rotary shaft which also at least indirectly drives said linkage mechanism; and wherein the linkage mechanism has an auxiliary pivoting lever coupled near a front edge of the door panel, a connecting rod which is connected to the auxiliary pivoting lever and which is pivotable around an axis of rotation that is fixed relative to the vehicle, and a coupler joining the connecting rod to a joint on the pivoting lever.

7. Motor vehicle door as claimed in claim 2, wherein said pivoting lever is connected in a central area of the door panel and has an approximately right-angle bend.

8. Motor vehicle door as claimed in claim 1, wherein said linkage mechanism includes means for locking the door panel in the closed position.

9. Motor vehicle door as claimed in claim 6, wherein the connecting rod is an angular lever having a shorter side and a longer side; and wherein the coupler is connected to the shorter side of the angular lever and the auxiliary pivoting lever is connected to said longer side.

10. Motor vehicle door as claimed in claim 6, wherein the pivoting lever has a shoulder which is eccentric relative to the rotary shaft and on which a joint for connection of the coupler to the pivoting lever is located.

11. Motor vehicle door as claimed in claim 6, wherein the coupler of the linkage mechanism is guided by a guide pin in a crank located near the rotary shaft.

12. Motor vehicle door as claimed in claim 10, wherein the coupler of the linkage mechanism is guided by a guide pin in a crank located near the rotary shaft.

13. Motor vehicle door as claimed in claim 11, wherein the crank has a slanted section and an arc-shaped section which is concentric to the rotary shaft.

14. Motor vehicle door as claimed in claim 13, wherein the pivoting lever is driven via a cam connected to the rotary shaft.

15. Motor vehicle door as claimed in claim 12, wherein the pivoting lever is driven via a cam connected to the rotary shaft.

16. Motor vehicle door as claimed in claim 14, further comprising a stop provided on the pivoting lever; wherein the cam, during opening of the door panel, runs against said stop and causes the stop to rotate after the guide pin has reached a transition from the slanted segment to the arc-shaped segment of crank.

17. Motor vehicle door as claimed in claim 1, wherein said distance between the axes of rotation on the door panel is a fixed distance.

18. A motor vehicle door arrangement for closing a door opening in an outside wall of a motor vehicle, comprising at least one door panel which in a closed position assumes an essentially flush position with the outside wall and a pivoting drive having a pivoting lever for swinging the door panel into an open position in which the door opening is at least partially exposed, the door panel assuming a position roughly parallel to said outside wall; wherein said pivoting drive comprises a linkage mechanism having means for causing a forward edge of the door panel, which is forward in a closing direction, to execute a movement by which said forward edge fits from the inside behind an associated part at an edge of the outside wall in the closed position, wherein said pivoting lever is connected between an axis of rotation which is fixed relative to the vehicle and an axis of rotation that is fixed at the door panel, and wherein said linkage mechanism is connected to move about the fixed axis of rotation of the pivot lever with rotation of the pivoting lever.

* * * * *